(12) United States Patent
Paladini et al.

(10) Patent No.: US 9,074,046 B2
(45) Date of Patent: Jul. 7, 2015

(54) PROCESS FOR THE PREPARATION OF POLYOXYALKYLENE AMINOPHOSPHONIC DISPERSING AGENTS R1-O-(CH$_2$—CH$_2$—O)$_n$-CH$_2$—CH$_2$—N(R2)-R3-NR4R5 (I)

(71) Applicant: GIOVANNI BOZZETTO S.P.A., Bergamo (IT)

(72) Inventors: Massimo Paladini, Bergamo (IT); Angela Rozzoni, Mapello (IT); Maurizio Bellotto, Milan (IT); Marco Marchesi, Bagnatica (IT)

(73) Assignee: GIOVANNI BOZZETTO S.P.A., Bergamo (IT)

( * ) Notice: Subject to any disclaimer, the term of this patent is extended or adjusted under 35 U.S.C. 154(b) by 0 days.

(21) Appl. No.: 14/391,736

(22) PCT Filed: Apr. 9, 2013

(86) PCT No.: PCT/EP2013/057371
§ 371 (c)(1),
(2) Date: Oct. 10, 2014

(87) PCT Pub. No.: WO2013/153054
PCT Pub. Date: Oct. 17, 2013

(65) Prior Publication Data
US 2015/0073175 A1    Mar. 12, 2015

(30) Foreign Application Priority Data

Apr. 11, 2012    (IT) .............................. MI2012A0588

(51) Int. Cl.
C07F 9/22        (2006.01)
C08G 65/335      (2006.01)
C04B 24/32       (2006.01)
C04B 103/40      (2006.01)

(52) U.S. Cl.
CPC ............ *C08G 65/3356* (2013.01); *C04B 24/32* (2013.01); *C04B 2103/408* (2013.01)

(58) Field of Classification Search
None
See application file for complete search history.

(56) References Cited

U.S. PATENT DOCUMENTS

| 5,879,445 A | 3/1999 | Guicquero et al. |
| 2008/0161222 A1* | 7/2008 | Paladini et al. ............... 510/436 |

FOREIGN PATENT DOCUMENTS

| DE | 1542202 | 3/1970 |
| FR | 2596754 | 10/1987 |

(Continued)

OTHER PUBLICATIONS

International Search Report and Written Opinion of Counterpart Application PCT/EP2013/057371, Oct. 16, 2013.

(Continued)

*Primary Examiner* — Karl J Puttlitz
(74) *Attorney, Agent, or Firm* — Silva Salvadori, P.C.

(57) ABSTRACT

Disclosed is a process for the preparation of compounds of formula (I) wherein R1 is C1-C4 alkoxy; R2 is hydrogen or a group of formula —CH$_2$—PO$_3$H$_2$ or is a group of formula R1-O—(CH$_2$—CH$_2$O)$_n$—CH$_2$—CH$_2$—; R3 is an alkylene, optionally substituted with one or more —NR2-groups; R4 and R5 are both a group of formula —CH$_2$—PO$_3$H$_2$ or one of them is a group of formula —CH$_2$—PO$_3$H$_2$ and the other is a group of formula R1-O—(CH$_2$—CH$_2$—O)-CH$_2$-CH$_2$-; n is an integer between 4 and 50; which comprises: a) reacting a compound of formula R1-O—(CH$_2$—CH$_2$—O)$_n$—CH$_2$—CH$_2$—OH with SOCl$_2$ or a similar reagent to give a compound of formula R1-O—(CH$_2$—CH$_2$—O)$_n$—CH$_2$—CH$_2$—Cl; b) reacting the compound obtained in a) with an amine of formula NH$_2$—R3'-NH$_2$ wherein R3' is an alkylene optionally substituted with one or more —NH-groups; c) reacting the compound obtained in b) with formaldehyde and phosphorous acid.

2 Claims, 5 Drawing Sheets

(56) References Cited

FOREIGN PATENT DOCUMENTS

| WO | WO2005073130 | 8/2005 |
|---|---|---|
| WO | WO2010112775 | 10/2010 |

OTHER PUBLICATIONS

Published International Search Report of Counterpart Application PCT/EP2013/057371, Dec. 12, 2013.

* cited by examiner

PROCESS FOR THE PREPARATION OF POLYOXYALKYLENE AMINOPHOSPHONIC DISPERSING AGENTS R1-O-(CH$_2$—CH$_2$—O)$_n$-CH$_2$—CH$_2$—N(R2)-R3-NR4R5 (I)

This application is a U.S. national stage of PCT/EP2013/057371 filed on Apr. 9, 2013, which claims priority to and the benefit of Italian Application No. MI2012A000588 filed on Apr. 11, 2012, the contents of which are incorporated herein by reference in their entireties.

FIELD OF INVENTION

The invention concerns a process for the preparation of polyoxyalkylene compounds with aminoalkylenephosphonic groups and the novel compounds obtainable by said process, which are useful as dispersing agents for hydraulic binders.

PRIOR ART

U.S. Pat. No. 5,879,445 and EP 663892 disclose the preparation of polyoxyalkylene compounds with aminoalkylenephosphonic groups, which are useful in particular as dispersing agents for hydraulic binders. The compounds described are obtained from an amino alcohol, in particular ethanolamine, by reaction of the corresponding alcoholate with an oxirane, typically ethylene oxide, and subsequent functionalisation of the amino group by reaction with formaldehyde and phosphorous acid.

Said preparation process has a number of drawbacks, mainly associated with the cost of the starting reagents and the low flexibility of the process, which is not readily adaptable to different types of structures.

DESCRIPTION OF THE INVENTION

A preparation process has now been found which is easily adaptable to polyoxyalkylene compounds with aminoalkylenephosphonic groups of various structures. The process according to the invention allows variation of the molecular weight of the MPEG used, the ratio between the —PO$_3$H$_2$ groups and the MPEG groups, and the type and structure of the amine, by controlling the molecular weight of the polymer and the separation between the —PO$_3$H$_2$ groups.

The performance of the dispersing agent can thus be optimized.

The process according to the invention allows the preparation of compounds of formula (I)

wherein R1 is C1-C4 alkoxy;
R2 is hydrogen or a group of formula —CH$_2$—PO$_3$H$_2$ or is a group of formula R1-O—(CH$_2$—CH$_2$O)$_n$—CH$_2$—CH$_2$—;
R3 is an alkylene, optionally substituted with one or more —NR2-groups;
R4 and R5 are both a group of formula —CH$_2$—PO$_3$H$_2$ or one of them is a group of formula —CH$_2$—PO$_3$H$_2$ and the other is a group of formula R1-O—(CH$_2$—CH$_2$—O)$_n$—CH$_2$—CH$_2$—;
n is an integer between 4 and 50.
Said process comprises:
a) reacting a compound of formula R1-O—(CH$_2$—CH$_2$—O)$_n$—CH$_2$—CH$_2$—OH with SOCl$_2$ or a similar reagent to give a compound of formula R1-O—(CH$_2$—CH$_2$—O)$_n$—CH$_2$—CH$_2$—Cl;

b) reacting the compound obtained in a) with an amine of formula NH$_2$—R3'-NH$_2$ wherein R3' is an alkylene optionally substituted with one or more —NH— groups;
c) reacting the compound obtained in b) with formaldehyde and phosphorous acid.

Some of the products of formula (I), identified in the detailed description of the invention, are novel, and constitute a further object of the invention.

DETAILED DESCRIPTION OF THE INVENTION

In the compounds of formula (I), R1 is preferably methoxy or ethoxy, and more preferably methoxy.

The R2 groups can be equal or different, and can, for example, all be groups of formula CH$_2$—PO$_3$H$_2$; or some of them can be hydrogen and others CH$_2$—PO$_3$H$_2$ groups; or some of them can be hydrogen, others CH$_2$—PO$_3$H$_2$ groups and others again can be R1-O—(CH$_2$—CH$_2$—O)$_n$—CH$_2$—CH$_2$ groups R3 is a C2-C10 alkylene optionally interrupted by 1 to 6 —NR2-groups.

Step a) of the process involves the synthesis of an alkoxy polyalkylene oxyglycol halide by halogenation, preferably by chlorination with an agent such as SOCl$_2$, in accordance with the following scheme R1-O—(CH$_2$—CH$_2$—O)$_n$—CH$_2$—CH$_2$—OH + SOCl$_2$ → R1-O—(CH$_2$—CH$_2$—O)$_n$—CH$_2$—CH$_2$—Cl + HCl + SO$_2$ This reaction can be conducted with alkoxy polyalkylene oxyglycols of any molecular weight. However, a molecular weight corresponding to values of n=10 or higher is preferable. The reaction can be run in batch, but it's advisable to perform a continuous process, to ensure better control of the reaction conditions (a particularly critical factor is temperature control, as the temperature must be kept to less than 85° C., preferably less than 75° C., and even more preferably less than 70° C.) and more gradual gas evolution, gases which must be separated and absorbed in a specific apparatus.

Step b) of the process can be carried out with diamines such as ethylenediamine (EDA), diethylenetriamine (DETA), triethylenetetraamine (TETA), tetraethylenepentaamine (TEPA) and pentaethylenehexamine (PEHA) of formula H$_2$N—CH$_2$—CH$_2$—NH—CH$_2$—CH2—NH—CH$_2$—CH$_2$—NH—CH$_2$—CH$_2$13 NH—CH$_2$—CH$_2$NH$_2$. Ammonia, polyethyleneimine (PEI) with a molecular weight between 800 and 5000, and ethylenediamine crosslinked with alkyl dichlorides Cl—R—Cl, wherein R ranges between C$_4$H$_8$ and C$_6$H$_{12}$, can also be used. The process according to the invention also relates to this embodiment although, in this case, the compounds obtained are not included in general formula (I).

More than one chloride/halide of formula R1-O—(CH$_2$—CH$_2$—O)$_n$—CH$_2$—CH$_2$—Cl per molecule of amine can be reacted.

Finally, step c) consists of the well-known phosphonation of the functionalised amine with formaldehyde and phosphorous acid. This reaction is preferably, but not exclusively, conducted up to saturation of all the nitrogen atoms not alkylated in the previous step.

Some of the compounds obtainable by the process are novel, and form a further object of the invention:

The compounds of formula (I) wherein R3 is ethylene or an alkylene substituted with one or more —NR2 groups, in particular those wherein the amine $NH_2$—R3'-$NH_2$ consists of pentaethylenehexamine (PEHA), are novel and are a further object of the invention. Said compounds offer a much better performance than the most high-performance products currently in use belonging to the polycarboxylate ether (PCE) class.

More specifically, the compounds according to the invention present high compatibility with different types of cement, good cohesion with the mixture, and good maintenance of workability. These properties make them particularly suitable for applications such as preparation of self-compacting concrete, preparation of pumpable concrete, uses in which high maintenance of workability is required, or for shotcrete.

The novel compounds according to the invention can also be mixed with superplasticisers such as polyether carboxylate or polynaphthalene sulphonate to improve their performance.

The invention will be now be described in greater detail in the following examples.

Synthesis Example 1

Synthesis of Phosphonate 10

1977 g of methoxy polyethylene glycol having a molecular weight of approx. 1100 are introduced into a glass flask and 280 g of thionyl chloride is added dropwise at 70° C., stirring, in about an hour. The mixture is kept stirred at 70° C. for 2 hours; then the reaction gases are removed under vacuum and the mixture is cooled down obtaining the corresponding methoxy polyethylene glycol chloride 1100 (Mpeg 1100-Cl).

1980 g of Mpeg1100-Cl are dissolved in water and reacted with 630 g of ethylenediamine at 80° C. for 6 hours. At the end of the reaction, the excess of ethylenediamine is removed with a series of distillations under vacuum, obtaining in a quantitative yield the compound (I) of formula $$CH_3O\text{—}(CH_2CH_2O)_n\text{—}CH_2CH_2\text{—}NH\text{—}CH_2CH_2NH_2 \quad (I)$$

where n is between 19 and 23.

2268 g of compound (I) are then dissolved in water and reflux reacted with 737 g of 70% $H_3PO_3$ in water, 638 g of 30% HCl and 530 g of 36% formaldehyde for 3 hours, to obtain phosphonate (II) of formula (II)

Phosphonate (II) is then diluted in water and neutralised with sodium hydroxide, and marketed in 30% aqueous solution.

Synthesis Example 2

Synthesis of Phosphonate 20

1770 g of methoxy polyethylene glycol having a molecular weight of approx. 2000 are introduced into a glass flask and 150 g of thionyl chloride is added dropwise at 70° C., stirring, in about an hour. The mixture is kept stirred at 70° C. for 2 hours; then the reaction gases are removed under vacuum and the mixture is cooled down obtaining the corresponding methoxy polyethylene glycol chloride 2000 (Mpeg 2000-Cl).

1785 g of Mpeg2000-Cl are dissolved in water and reacted with 560 g of ethylenediamine at 80° C. for 4 hours. At the end of the reaction, the excess of ethylenediamine is removed with a series of distillations under vacuum, obtaining in a quantitative yield the compound (I) of formula $$CH_3O\text{—}(CH_2CH_2O)_n\text{—}CH_2CH_2\text{—}NH\text{—}CH_2CH_2NH_2 \quad (I)$$

where n is between 38 and 46.

1878 g of compound (I) is then dissolved in water and reflux reacted with 331 g of 70% $H_3PO_3$ in water, 316 g of 30% HCl and 237 g of 36% formaldehyde for 3 hours, to obtain phosphonate (II) of formula (II)

Phosphonate (II) is then diluted in water and neutralised with sodium hydroxide, and marketed in 30% aqueous solution.

Synthesis Example 3

Synthesis of Phosphonate 106

1795 g of methoxy polyethylene glycol having a molecular weight of approx. 1100 are introduced into a glass flask and 254 g of thionyl chloride is added dropwise at 70° C., stirring, in about an hour. The mixture is kept stirred at 70° C. for 2 hours; then the reaction gases are removed under vacuum and the mixture is cooled down obtaining the corresponding methoxy polyethylene glycol chloride 1100 (Mpeg 1100-Cl).

1798 g of Mpeg1100-Cl is dissolved in water and reacted with 204 g of pentaethylenehexamine at 100° C. for 10 hours. At the end of the reaction, compound (I) of formula $$CH_3O\text{—}(CH_2CH_2O)_n\text{—}CH_2CH_2\text{—}NH\text{—}CH_2CH_2\\(NHCH_2CH_2)_3\text{—}NHCH_2CH_2NHCH_2CH_2\\(OCH_2CH_2)nOCH_3 \quad (I)$$

where n is between 19 and 23, is obtained in a quantitative yield.

2000 g of compound (I) is then dissolved in water and reflux reacted with 631 g of 70% $H_3PO_3$ in water, 750 g of 30% HCl and 527 g of 36% formaldehyde for 3 hours, to obtain phosphonate (II) of formula (II)

Phosphonate (II) is then diluted in water and neutralised with sodium hydroxide, and marketed in 30% aqueous solution.

Synthesis Example 4

Synthesis of Phosphonate 206

1770 g of methoxy polyethylene glycol having a molecular weight of approx. 2000 are introduced into a glass flask and 150 g of thionyl chloride is added dropwise at 70° C., stirring, in about an hour. The mixture is kept stirred at 70° C. for 2 hours; then the reaction gases are removed under vacuum and the mixture is cooled down obtaining the corresponding methoxy polyethylene glycol chloride 2000 (Mpeg 2000-Cl).

1785 g of Mpeg2000-Cl is dissolved in water and then reacted with 108.0 g of pentaethylenehexamine at 100° C. for 10 hours. At the end of the reaction, compound (I) of formula (I)

where n is between 38 and 46, is obtained in a quantitative yield.

1888 g of compound (I) are then dissolved in water and reflux reacted with 309 g of 70% $H_3PO_3$ in water, 370 g of 30% HCl and 272 g of 36% formaldehyde for 3 hours, to obtain phosphonate (II) of formula (II)

Phosphonate (II) is then diluted in water and neutralised with sodium hydroxide, and marketed in 30% aqueous solution.

Application Example 1

The performance properties of the products synthesised in examples 1), 2), 3) and 4) are compared below with those of a latest-generation PCE superplasticiser. The tests are conducted in standard CEN mortar with a water-to-cement (W/C) ratio of 0.5. The dosages of superplasticiser are expressed as the weight of dry matter to the weight of cement. The cement used is a CEM II/A-LL 42.5 R, which is commonly used for infrastructural applications. For all mixtures the target initial static flow (without shocks) is set to 170 mm on the flow table. The admixture dosage required to obtain this flow is reported in FIG. 1, together with the dynamic flow value (with shocks).

Figure 1:
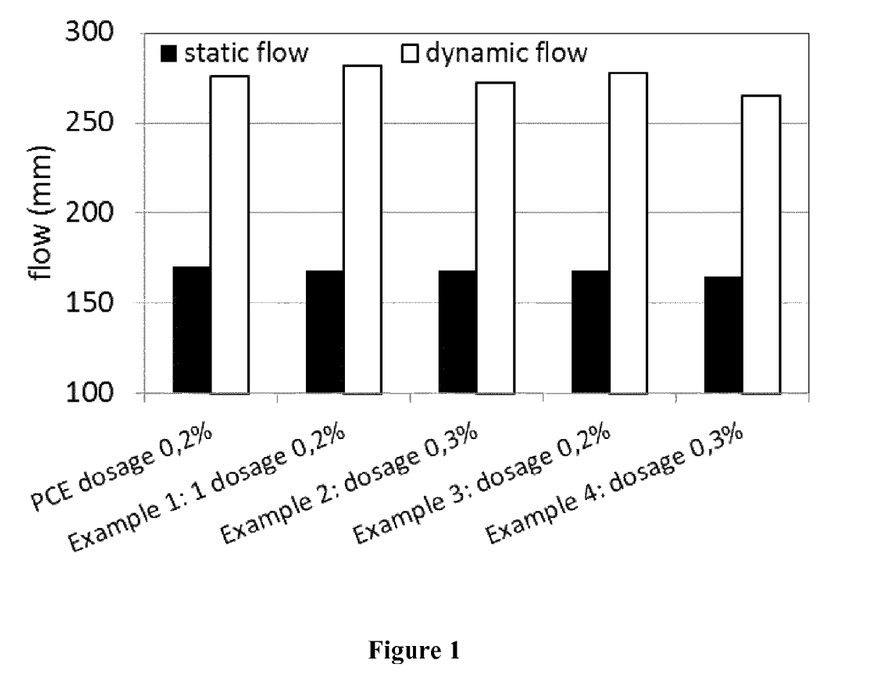
FIG. 1 compares the performance properties of the products synthesized in examples 1)-4) with those of a latest generation PCE superplasticizer.

The products synthesized in examples 1 and 3 exhibit an efficiency comparable with that of a PCE, whereas those synthesized in examples 2 and 4 exhibit an efficiency approx. 50% lower.

Figure 2:
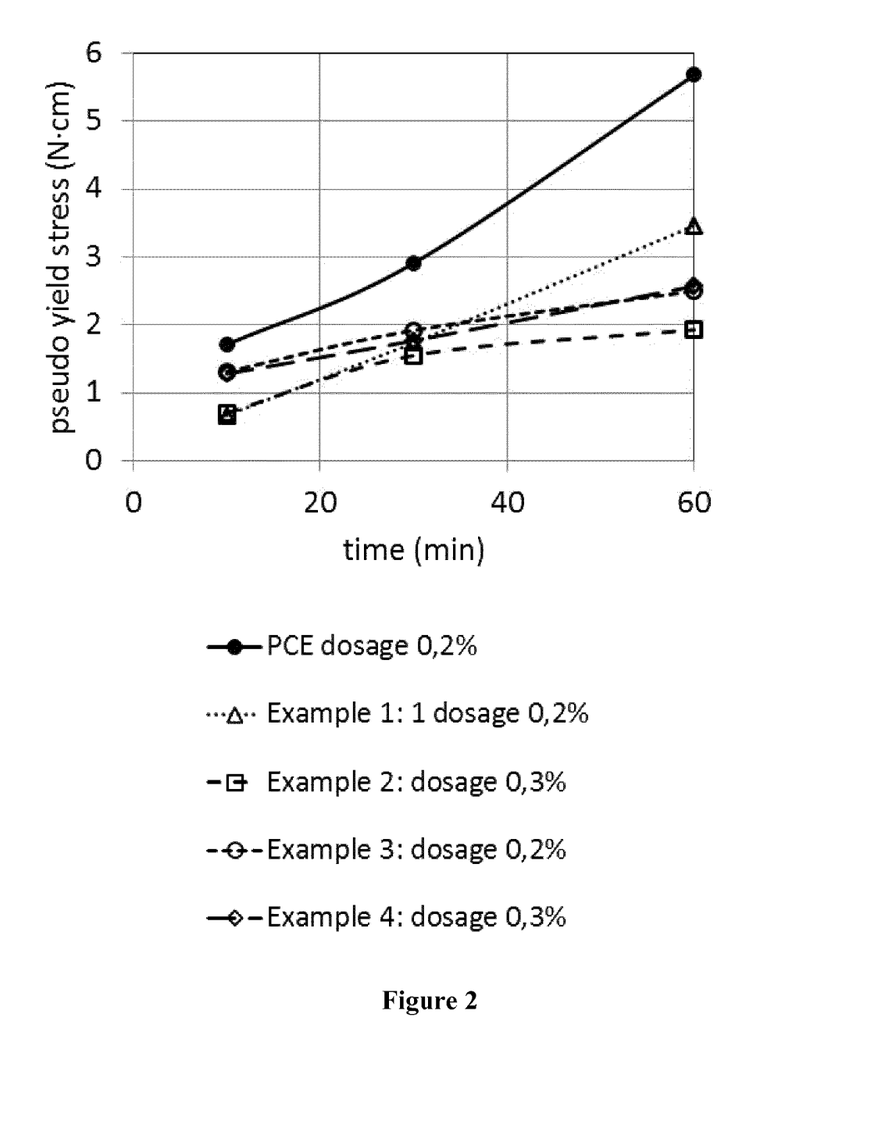
FIG. 2 shows the maintenance workability expressed as the reduction in the shear (pseudo)threshold of the mixture over time.

Maintenance of workability, expressed as the reduction in the shear (pseudo)threshold of the mixture over time, is reported in FIG. 2.

As will be seen, initial fluidity being equal, the products to which the present patent relates, in particular the product of synthesis example no. 2, guarantee prolonged maintenance of workability. It should also be noted that, initial fluidity being equal, the products to which the present patent relates, and in particular the products of synthesis examples nos. 1 and 2, exhibit a lower shear threshold than the PCE superplasticiser. This behaviour is particularly interesting for the manufacture of superfluid concretes and mortars, where the mixture must be flowable, not viscous.

Figure 3:
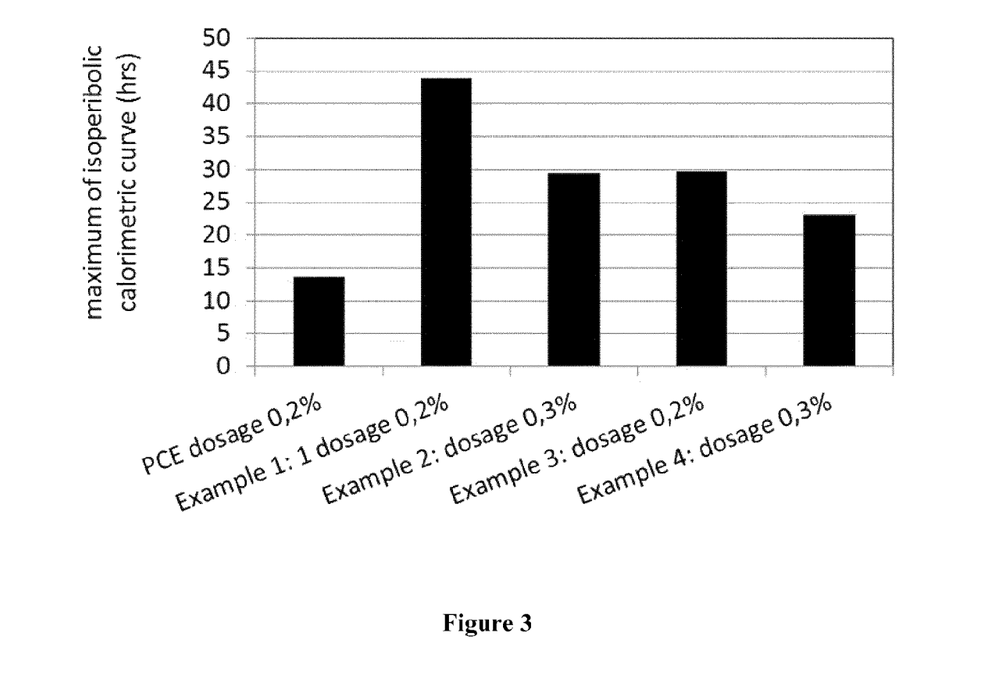
FIG. 3 shows the maintenance of workability associated with delays in hydration reactions.

This prolonged maintenance of workability is associated with different delays in hydration reactions, and consequently setting, for different products, as indicated in FIG. 3.

The longest delay is caused by the product of synthesis example no. 1, and the shortest by the product of synthesis example no. 4.

Application Example 2

The characteristics of good cohesion and high flowability imparted to the concrete by the admixtures according to the present patent, together with prolonged maintenance of workability, make these superplasticisers particularly suitable for the manufacture of superfluid concretes with consistency class S5 or SCC, especially when the concrete is to be pumped over long distances.

The preparation of an SCC concrete which maintains its workability for 8 hours at a mixing and casting temperature of 30° C. forms the object of the following example. The superplasticiser used is the one referred to in synthesis example no. 2, and the concrete has the following composition:

| Constituent | Dose (Kg/m³) |
| --- | --- |
| cement (white Portland CEM II/B-LL 32.5 R) | 400 |
| water | 180 |
| coarse limestone aggregate (2-16 mm) | 875 |
| fine limestone aggregate (0-4 mm) | 440 |
| limestone sand (0-2 mm) | 430 |
| marble dust | 100 |
| superplasticiser (30% solution) | 9 |

Figure 4:
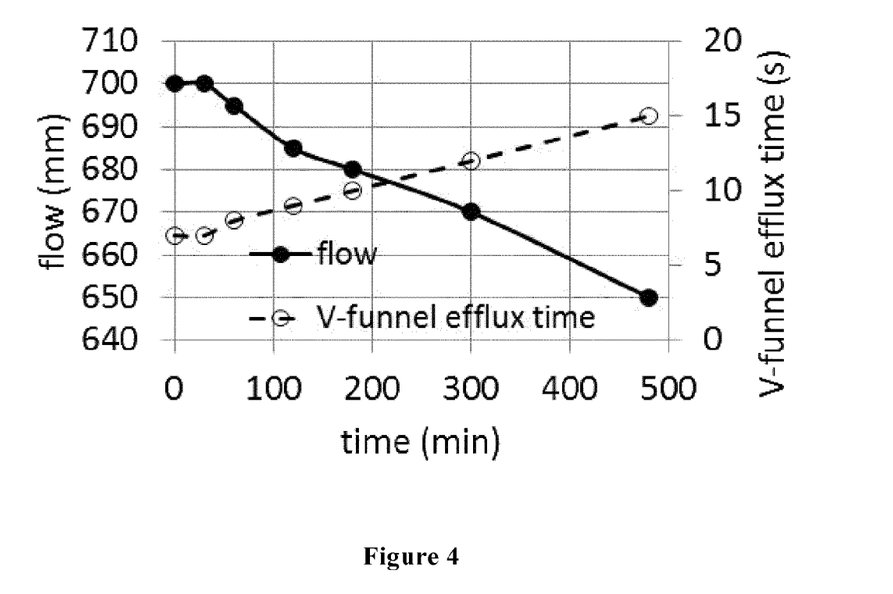
FIG. 4 shows the flow and the efflux time from the V-funnel.
Figure 5:
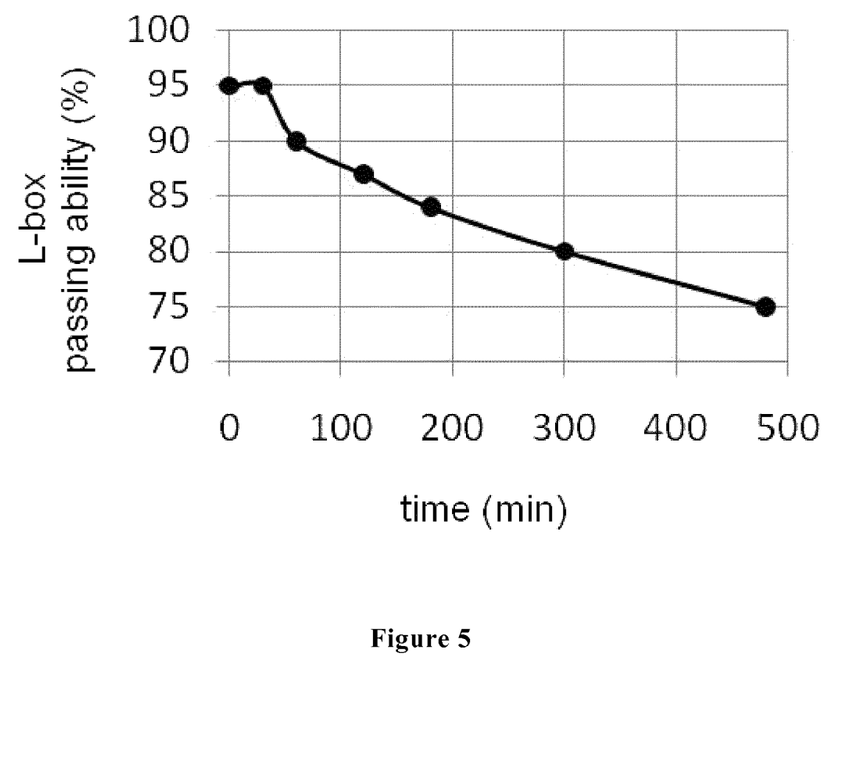
FIG. 5 shows the % L-box passing ability.

The flow and the efflux time from the V-funnel are reported in FIG. 4, while the L-box passing ability is reported in FIG. 5.

The compression resistance of this SCC concrete reaches 12 MPA after 30 hours' curing under humidity saturation conditions.

Application Example 3

A pumpable concrete of resistance class $R_{ck}$ 30 Mpa, exposure class XC2, consistency class S5 and workability maintenance of 4 hours was made with the superplasticiser referred to in synthesis example no. 2. The composition of the concrete is as follows:

| Constituent | Dose (Kg/m³) |
| --- | --- |
| cement (CEM II/A-LL 32.5 R) | 400 |
| water | 199 |
| sand 0/2 mm | 475 |
| fine aggregate 0/6 mm | 489 |
| coarse aggregate 6/16 | 786 |
| superplasticiser (30% solution) | 7 |

This concrete was pumped for a distance of 500 meters, with a height difference of 100 meters.

The invention claimed is:

1. Compounds of formula (I):

$$\text{R1-O—(CH2—CH2—O)n—CH2—CH2—N(R2)-R3-NR4R5} \quad (I)$$

wherein R1 is C1—C4 alkyl;

R2 is hydrogen or a group of formula —$CH_2$—$PO_3H_2$ or is a group of formula R1—O—($CH_2$—$CH_2O$)$_n$—$CH_2$—$CH_2$—;

R3 is an alkylene substituted with one or more —NR2- groups;

R4 and R5 are both a group of formula —$CH_2$—$PO_3H_2$ or one is a group of formula —$CH_2$—$PO_3H_2$ and the other is a group of formula R1-O—($CH_2$—$CH_2$—O)$_n$—$CH_2$—$CH_2$—;

n is an integer from 4 to 50.

2. Dispersing admixtures for hydraulic binders comprising a compound as claimed in claim 1.

* * * * *